United States Patent
Morita et al.

[11] Patent Number: 5,948,469
[45] Date of Patent: Sep. 7, 1999

[54] METHOD FOR PREPARING SILICONE RUBBER PARTICULATES COATED WITH METAL OXIDE MICROPARTICLES

[75] Inventors: Yoshitsugu Morita; Atsushi Sakuma, both of Chiba Prefecture, Japan

[73] Assignee: Dow Corning Toray Silicone Co., Ltd., Tokyo, Japan

[21] Appl. No.: 07/885,419

[22] Filed: May 19, 1992

[30] Foreign Application Priority Data

May 27, 1991 [JP] Japan .................................. 3-151099

[51] Int. Cl.⁶ ........................................... B05D 5/00
[52] U.S. Cl. ...................... 427/197; 427/199; 427/212; 427/222; 428/405; 428/407; 523/204; 523/212
[58] Field of Search .................... 427/212, 217, 427/197, 199, 222; 523/204, 212; 428/405, 407

[56] References Cited

U.S. PATENT DOCUMENTS

| | | | |
|---|---|---|---|
| 4,172,871 | 10/1979 | Elsworth | 264/131 |
| 4,248,751 | 2/1981 | Willing | 260/29.2 M |
| 4,742,142 | 5/1988 | Shimuzu et al. | 528/15 |
| 4,743,670 | 5/1988 | Yoshida et al. | 528/15 |
| 4,761,454 | 8/1988 | Oba et al. | 524/862 |
| 4,871,616 | 10/1989 | Kimura et al. | 428/407 |
| 4,911,974 | 3/1990 | Shimizu et al. | 428/143 |
| 4,985,277 | 1/1991 | Shimizu et al. | 427/180 |

FOREIGN PATENT DOCUMENTS

| | | |
|---|---|---|
| 304946 | of 1989 | European Pat. Off. . |
| 373941 | 6/1990 | European Pat. Off. . |
| 6327410 | 2/1988 | Japan . |
| 6368513 | 3/1988 | Japan . |
| 6330956 | 5/1988 | Japan . |
| 306471 | 12/1989 | Japan . |
| 2163127 | 6/1990 | Japan . |

OTHER PUBLICATIONS

Japanese Abstract, 63309565, 88/12/16, Toray Silicone.

*Primary Examiner*—Robert Dawson
*Attorney, Agent, or Firm*—Arne R. Jarnholm; Alex Weitz

[57] ABSTRACT

A novel method for preparing silicone rubber particulates coated with metal oxide microparticles, wherein the metal oxide microparticles are derived from a sol, is disclosed. The silicone rubber particulate so prepared has the advantage of reducing aggregation of the particulate mass. The silicone rubber particulate has particular utility as an additive to organic resins for modifying the properties thereof.

8 Claims, No Drawings

METHOD FOR PREPARING SILICONE RUBBER PARTICULATES COATED WITH METAL OXIDE MICROPARTICLES

BACKGROUND OF THE INVENTION

1. Field of the Invention

The present invention relates generally to silicone rubber particulate and more specifically to silicon rubber particulate coated with metal oxide.

2. Description of the Prior Art

Silicone rubber particulates, water-based dispersions of silicone rubber particulates, and methods for the preparation thereof are known from Japanese Patent Application Laid Open [Kokai or Unexamined] Numbers 63-77942 [77,942/88], 64-70558 [70,558/89], and 63-309565 [309,565/88]. It is also known that silicone rubber particulates are useful as additives for improving or modifying the physical properties of various types of organic resins.

However, the particles in the silicone rubber particulates of the prior art have a strong tendency to combine with one another and aggregate. This prevents the development of the properties associated with the silicone rubber particulate in and of itself and thus limits the applications of these silicone rubber particulates. For example, due to their ease of aggregation and poor dispersibility, the prior art silicone rubber particulates cannot be homogeneously dispersed in organic resins of a different type and therefore cannot satisfactorily manifest their properties or characteristics.

BRIEF SUMMARY OF THE INVENTION

In accordance with the present invention, there is provided a silicone rubber particulate and a method of making the same, wherein the surface of the silicone rubber particles is coated with metal oxide microparticles. Because the surface of the particles is coated, the silicone particulate of the invention resists aggregation to the extent it occurs with prior art silicone particulate. The coated silicone particulate of the invention is particularly useful as an additive to organic resins to improving or modify the physical properties of the resins.

Preferably, the silicone rubber particulate has average particle diameter of 0.1 to 200 micrometers and the metal oxide microparticles used to coat the same have an average particle size between 0.001 and 0.1 micrometers.

In the preferred embodiment of the invention, the coated silicone particulate is formed from a homogeneous mixture of:

(A) a water-based dispersion of a silicone rubber particulate with an average particle diameter of 0.1 to 200 micrometers; and (B) a metal oxide sol.

When the water fraction is removed from the above mixture by evaporation, the result is that the silicone rubber particles are coated with the metal oxide.

DETAILED DESCRIPTION OF THE INVENTION

The silicone rubber particulate of the present invention comprises a particulate having an average particle diameter of 0.1 to 200 micrometers and wherein the surface of the particles is coated with metal oxide microparticles. Silicone rubbers as known from the art can be used as the silicone rubber component of this silicone rubber particulate. Examples of such silicone rubbers include:

silicone rubbers afforded by the cure of organoperoxide-curing silicone rubber compositions whose basic components are organoperoxide and alkenyl-containing diorganopolysiloxane, and which optionally contain reinforcing filler;

silicone rubbers afforded by the cure of addition-reaction-curing silicone rubber compositions whose basic components are a platinum-type compound, SiH-containing organopolysiloxane, and diorganopolysiloxane containing Si-bonded alkenyl groups, and which optionally contain reinforcing filler;

silicone rubbers afforded by the cure of condensation-reaction-curing silicone rubber compositions whose basic components are silanol-terminated diorganopolysiloxane, SiH-containing organopolysiloxane, and organontin compound, and which optionally contain reinforcing filler; and silicone rubbers afforded by the cure of condensation-reaction-curing silicone rubber compositions whose basic components are silanol-terminated diorganopolysiloxane, hydrolyzable organosilane, and organotin compound or titanate ester, and which optionally contain reinforcing filler.

The latter two types, i.e., silicone rubbers afforded by the cure of addition-reaction-curing silicone rubber compositions and by the cure of condensation-reaction-curing silicone rubber compositions, are preferred for the present invention due to their ease of preparation and ease of handling.

The average particle diameter of the silicone rubber particulate prepared from silicone rubber as described above should fall within the range of 0.1 to 200 micrometers and preferably falls within the range of 0.5 to 80 micrometers. When the average particle diameter falls below 0.1 micrometers, the metal oxide will not uniformly coat the surface of the silicone rubber particulate and the silicone rubber particulate will itself form granules. On the other hand, average particle diameters in excess of 200 micrometers are too large; for example, such a silicone rubber particulate cannot be employed as a physical property-modifying additive for organic resins.

The metal oxide microparticles are exemplified by microparticles of silicon oxide, titanium oxide, aluminum oxide, zirconium oxide, and antimony oxide. The particle diameter of the metal oxide should assume values suitable for coating the surface of the aforesaid silicone rubber particulate, and metal oxide particles useful for this purpose will have sizes no larger than one-tenth the particle diameter of the silicone rubber particulate to be coated. In general, average particle diameters within the range of 0.001 to 0.1 micrometers are used.

The method for preparing the particulate according to the present invention will now be considered in greater detail. The component (A) employed in the present invention's preparative method comprises a water-based dispersion of silicone rubber particulate with an average particle diameter of 0.1 to 200 micrometers. The same silicone rubber compositions known from the art as described hereinbefore are applicable as compositions useable for this invention. The latter two types, i.e., silicone rubbers afforded by the cure of addition-reaction-curing silicone rubber compositions and silicone rubbers afforded by the cure of condensation-reaction-curing silicone rubber compositions, are again preferred for the present invention due to their ease of preparation and ease of handling.

Several methods are available for the preparation of component (A) (water-based dispersion of silicone rubber particulate), and concrete examples of its preparation are provided as follows:

(1) An addition-reaction-curing silicone rubber composition is first prepared from a platinum-type compound catalyst, organohydrogenpolysiloxane containing at least 2 silicon-bonded hydrogen atoms in each molecule, and organopolysiloxane containing at least 2 alkenyl groups (typically vinyl) in each molecule. This addition-reaction-curing silicone rubber composition is introduced into water or surfactant-conitaining water and dispersed into particles by stirring the water or surfactant-containing water. Curing is then carried out with heating or merely by maintenance as such.

(2) A condensation-reaction-curing silicone rubber composition is first prepared from a platinum-type catalyst, diorganopolysiloxane containing 2 hydroxyl groups (at the two molecular chain terminals), and organohydrogenpolysiloxane containing at least 3 silicon-bonded hydrogen atoms in each molecule; this condensation-reaction-curing silicone rubber composition is introduced into water or surfactant-containing water and dispersed into particles by stirring the water or surfactant-containing water; and curing is then carried out with heating or merely by maintenance as such.

The extent of cure in the silicone rubber particulate is not specifically restricted within the context of the present invention, and the present invention encompasses silicone rubber particulates with cures ranging from partial to complete.

The metal oxide sol comprising the component (B) employed by the present invention's preparative method is the component which equips the silicone rubber particulate according to the present invention with dispersibility and lubricity. This metal oxide sol is exemplified by silicon oxide sols, titanium oxide sols, aluminum oxide sols, zirconium oxide sols, and antimony oxide sols. The quantity of use of component (B) is not specifically restricted as long as (i) it is present in a quantity which will afford a homogeneous mixture, i.e., a homogeneous water-based dispersion, when preparing the mixture of components (A) and (B), and (ii) it is present in a quantity sufficient for coating the surface of component (A).

However, component (B) is preferably employed at 0.1 to 100 weight parts per 100 weight parts component (A) and particularly preferably at 1 to 50 weight parts per 100 weight parts component (A).

The silicone rubber particulate in this case should have an average particle diameter of 0.1 to 200 micrometers and preferably 0.5 to 80 micrometers. When this average particle diameter falls below 0.1 micrometers, the metal oxide will not uniformly coat the surface and the silicone rubber particulate will itself form granules.

Furthermore, the water-based dispersion of silicone rubber particulate is advantageously prepared by a method such as (1) or (2) above by preliminarily calculating and adjusting the quantity of water, quantity of silicone rubber particulate, quantity of emulsifying agent, etc., taking into consideration the nature of the mixture after the addition of component (B).

In the preparative method according to the present invention, the water is then removed from this mixture of components (A) and (B) as described hereinbefore. The water can be easily removed using a thermal dryer as known in the art, for example, a hot-air circulation oven or spray dryer. The present invention's silicone rubber particulate as described hereinbefore in and of itself has an excellent lubricity and in particular an excellent dispersibility in various types of organic resins. It can therefore be used, for example, as an additive for modifying the physical properties of organic resins.

The present invention will be explained in greater detail below through illustrative and reference examples, in which parts are by weight.

REFERENCE EXAMPLE 1

The following were mixed: 100 parts dimethylvinylsiloxy-termininated dimethylpolysiloxane with a viscosity of 0.5 Pa sec (500 centipoise) and a vinyl content of 0.5 weight %, 3 parts trimethylsiloxy-terminated methylhydrogenpolysiloxane with a viscosity of 0.01 Pa sec (10 centipoise) and silicon-bonded hydrogen atom content of 1.5 weight %, and 0.3 parts isopropanolic chloroplatinic acid solution with platinum content of 3 weight %. A mixture of 3 parts nonionic surfactant and 400 parts water was added all at once with mixing to homogeneity to yield the water-based dispersion of a silicone rubber composition. This mixture was then poured into 80 C. water, and the water-based dispersion of a silicone rubber particulate was obtained by stirring. This silicone rubber particulate had an average particle diameter of 4 micrometers.

Example 1 of the Invention

100 Parts of the water-based dispersion of silicone rubber particulate from Reference Example 1 and 5 parts silicon oxide sol (trademark "Colloidal Silica Cataloid-s", a product of Shokubai Kasai Kogyo Kabushiki Kaishia, Japan, having a solids concentration of 20 weight % and an average particle diameter of 0.01 to 0.02 micrometers) were mixed to homogeneity, and this mixture was then sprayed using a rotary nozzle into a spray dryer (diameter=2 m, height=4 m). The cure of the silicone rubber particulate was brought to completion simultaneous with removal of the water fraction. This spray drying process.employed a spray rate of 10 kg/hour and a hot-current temperature of 140 C. The silicone rubber particulate was recovered by collecting the cured product using a cyclone.

Under a scanning electron microscope it was observed that the resulting particles were spherical, highly uniform, and free of air bubbles and consisting of a silicone rubber particulate wherein the surface of the silicone rubber particles was coated with silicon oxide microparticles.

In order to evaluate the secondary aggregability of this silicone rubber particulate, its bulk density was measured before and after loading it. The bulk density was measured in accordance with the Bulk Measurement Methods stipulated in JIS (Japanese Industrial Standard) K 5101. The aggregability was evaluated as follows: 50 cc silicone rubber partictulate was placed in a 100 cc beaker, a 5 g load was applied on the surface, and the bulk density was measured after standing in this state for 2 days. In addition, 5% silicone rubber particulate was added to a phthalic acid resin paint (trademark Number One for Steel Sheet, a product of Nippon Paint Kabushiki Kaisha, Japan), and this was painted on an aluminum panel to a film thickness of 50 micrometers. The particle size distribution on the painted surface was then inspected. The various results are reported in Table 1 below.

Example 2 of the Invention

10 Parts of titanium oxide sol (a product of Shokubai Kasei Kogyo Kabushiki Kaishia, Japan, having a solids concentration of 10 weight %, and an average particle diameter of 0.01 micrometers) was mixed to homogeneity into 100 parts of the water-based dispersion of silicone rubber particulate from Reference Example 1. The water was then removed from this mixture as described in Example 1 of the Invention to afford a silicone rubber particulate wherein the surface of the silicone rubber particles was coated with titanium oxide microparticles.

This silicone rubber particulate was then subjected to an evaluation of secondary aggregability and particle size distribution as described in Example 1, and these results are reported in Table 1 below.

Example 3 of the Invention

16 Parts aluminum oxide sol (a product of Shokubai Kasei Kogyo Kabushiki Kaisha, Japan, having a solids concentration of 7 weight % and an average particle (fibrous) size=0.1 L×0.011 D micrometers) was mixed to homogeneity into 100 parts water-based dispersion of silicone rubber particulate from Reference Example 1. The water was then removed from this mixture as in Example 1 of the Invention to afford a silicone rubber particulate wherein the surface of the silicon rubber particles was coated with aluminum oxide microparticles.

This silicone rubber particulate was then subjected to an evaluation of secondary aggregability and particle size distribution as described in Example 1 of the Invention, and these results are reported in Table 1 below.

Example 4 of the Invention

The following were mixed: 97 parts silanol-terminated dimethylpolysiloxane having a viscosity of 0.1 Pa sec (100 centipoise) and a silanol group content of 1.3 weight %, 3 parts gamma-glycidoxypropyltrimethoxysilane, 5 parts trimethylsiloxy-terminated methylhydrogenpolysiloxane having a viscosity of $10^{-5}$ m$^2$/sec (10 centistokes) and a silicon-bonded hydrogen atom content of 1.5 weight %, 5 parts wet-method silica, and 1.0 part dibutyltin dioctoate. A mixture of 8 parts nonionic surfactant and 300 parts water was then added all at once, and mixing to homogeneity afforded a water-based dispersion of the silicone rubber composition. This water-based dispersion was held for 10 hours at ambient temperature to give a water-based dispersion of the silicone rubber particulate. 5 Parts silicon oxide sol (a product of Shokubai Kasei Kogyo Kabushiki Kaisha, Japan, having a solids concentration of 20 weight %) was mixed to homogeneity into 100 parts of this water-based dispersion, and water removal as described in Example 1 of the Invention. This resulted in silicone rubber particles having an average particle diameter of 3 micrometers wherein the surface of the particles was coated with silicon oxide microparticles.

This silicone rubber particulate was then subjected to an evaluation of secondary aggregability and particle size distribution as described in Example 1 of the Invention, and these results are reported in Table 1 below.

A comparison experiment was conducted by proceeding as above, but in this case the silicone rubber particulate was prepared by removing the water directly from the water-based dispersion of silicone rubber particulate prepared in Reference Example 1.

In another comparison experiment, 1 weight % dry-method silica (trademark Aerosil 200, a product of Nippon Aerosil Kabushiki Kaisha, Japan, having a specific surface of 200 m$^2$/g) was mixed into the water-based dispersion of silicone rubber particulate prepared in Reference Example 1. The water was removed from this mixture as in Example 1 of the invention to yield a silicone rubber particulate. The secondary aggregability and particle size distribution on the painited surface were then evaluated as described in Example 1 of the Invention. These results are reported in Table 1 as Comparison Examples 1 and 2.

Example 5

The dispersibility in cyclohexanone of each silicone rubber particulate was evaluated by adding and mixing 95 g cyclohexanone with 5 g of each of the silicone rubber partictulates prepared in Examples 1 through 4 and Comparison Examples 1 and 2, and these results are reported in Table 2.

TABLE 1

|  | examples | | | | comparison examples | |
| --- | --- | --- | --- | --- | --- | --- |
|  | 1 | 2 | 3 | 4 | 1 | 2 |
| bulk density immediately after preparation (g/cc) | 0.21 | 0.20 | 0.20 | 0.12 | 0.20 | 0.20 |
| bulk density after two days (g/cc) | 0.21 | 0.21 | 0.20 | 0.12 | 0.22 | 0.23 |
| percentage of aggregates ≧ 100 micrometers on the painted surface (%) | ≦20% | ≦5% | ≦5% | ≦5% | ≧30% | ≧50% |

TABLE 2

|  | examples | | | | comparison examples | |
| --- | --- | --- | --- | --- | --- | --- |
|  | 1 | 2 | 3 | 4 | 1 | 2 |
| dispersibility (visual evaluation) | ++ | + | ++ | ++ | x | x |

++ superior
+ excellent
x poor
xx not dispersed

Because the silicone rubber particulate of the present invention comprises a silicone rubber particulate with average particle diameter of 0.1 to 200 micrometers, wherein the surface of the silicone rubber particles is coated with metal oxide microparticles, it is characterized by little variation in bulk density, a corresponding inhibition of secondary aggregability and by excellent dispersibility and lubricity.

In addition, the preparative method of the present invention characteristically provides this silicone rubber particulate in a highly productive manner.

What is claimed is:

1. A method of coating silicone rubber particles with metal oxide particles comprising the steps of:

forming a water-based dispersion of silicone rubber particles;

adding to said dispersion a water-based metal oxide sol; and removing the water from the above mixture by spray-drying.

2. A method in accordance with claim 1 wherein said silicone particles have an average diameter of 0.1 to 200 micrometers.

3. A method in accordance with claim 1 wherein said metal oxide sol has an average particle size between 0.001 and 0.1 micrometers.

4. A method in accordance with claim 2 wherein said metal oxide sol is formed from metals of the group consisting of silicon, titanium, aluminum, zirconium and antimony.

5. A method in accordance with claim 1 wherein said silicone ribber particle dispersion is formed from an addition-reaction-curing of an organohydrogenpolysiloxane having at least two silicon-bonded hydrogen atoms in each molecule and an organopolysiloxane having at least 2 alkenyl groups in each molecule.

6. A method in accordance with claim 1 wherein said silicone rubber particle dispersion is formed from a condensation reaction curing of an hydroxy-terminated diorganopolysiloxane and an organohydrogenpolysiloxane having at least three silicon-bonded hydrogen atoms in each molecule.

7. A method in accordance with claim 1 wherein said step of removing water from the mixture by spray-drying is carried out at a temperature sufficient to remove said water by evaporation and simultaneously cause said silicone rubber to cure.

8. A method in accordance with claim 1 wherein the average particle size of said metal oxide particles is about one-tenth the average particle size of said silicone rubber particles.

* * * * *